May 16, 1967 E. G. SMOCK 3,319,994

CLOSED TRAILER WITH ELEVATED ENCLOSURE

Filed Dec. 22, 1964 2 Sheets-Sheet 1

INVENTOR.
EDMUND G. SMOCK

BY Kimmel, Crowell & Weaver
ATTORNEYS.

INVENTOR.
EDMUND G. SMOCK

United States Patent Office 3,319,994
Patented May 16, 1967

3,319,994
CLOSED TRAILER WITH ELEVATED
ENCLOSURE
Edmund G. Smock, 3155 Winding Way,
Zanesville, Ohio 43701
Filed Dec. 22, 1964, Ser. No. 420,313
7 Claims. (Cl. 296—100)

This invention pertains in general to load carrying or material handling vehicles, such as trucks, trailers, vans, railroad flat bed cars and the like, and more particularly to a removable van cover for such vehicles having a substantially rigid van type cover enclosure which may be raised or opened at the top, side or end as desired for positional loading or unloading of such vehicles of steel stock, pallet loaded material, large bulky articles or packages or other forms of loads, as desired.

Many of the present types of trailer or transport types of vehicle are unduly limited in their use, because they either afford inadequate protection to their load contents from inclement weather, or because of their inherent structure they are restricted in general use because of their inflexibility of being loaded or unloaded of various types of material from the top, ends or sides of such a van covered vehicle as aforementioned.

The instant invention solves the above problems by providing a weather tight van which internal space of the van envelope or body is not unduly restricted by the size of the access door to be used, and can be loaded and unloaded by present modern equipment such as lift trucks, hoists and the like, from the top, sides, or ends of the van.

The instant new van cover or envelope may have a roof cover in shape which is either flat, hip or semi-oval in configuration.

The new inventive van envelope or cover may be made of aluminum or any type of material presently used in van trailers, consistent with required structural strength, safety in commerce and economic manufacture thereof.

The primary object of this invention is to provide an improved van body or envelope having a new body construction which is cheap to manufacture, rigid in strength, durable, dependable, will protect load contents thereof in use in all kinds of weather, and will afford loading and unloading thereof from the top, sides and ends of the van as desired by modern material handling equipment.

A further object of the invention is to provide a weather tight van enclosure for a flat bed vehicle having a roof which is self-contained and may be raised and lowered to facilitate loading and unloading of the vehicle.

Another object of the invention is to provide a van enclosure, wherein the roof is adjustable in elevation and the sides are adjustable in height to correspond to the disposition of the roof whereby the vehicle is adapted for various volumetric capacities.

With the above and other objects in view, the invention has particular relation to certain novel features of construction, arrangements of parts and use, examples of which are given in this specification and illustrated in the accompanying drawings, wherein:

FIGURE 4 is a rear elevational view of the van of the invention showing the top of the van open as indicated in dotted lines for top loading or unloading by a derrick hoist or the like.

In the drawings like reference numerals represent like parts.

Figure 1:
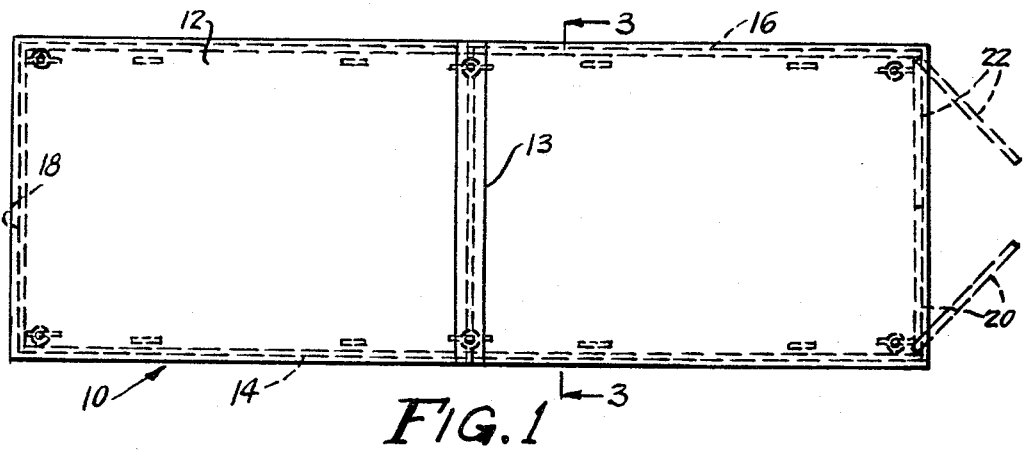
FIGURE 1 is a plan view of the instant inventive van type cover or envelope for a flat bed vehicle.
Figure 2:
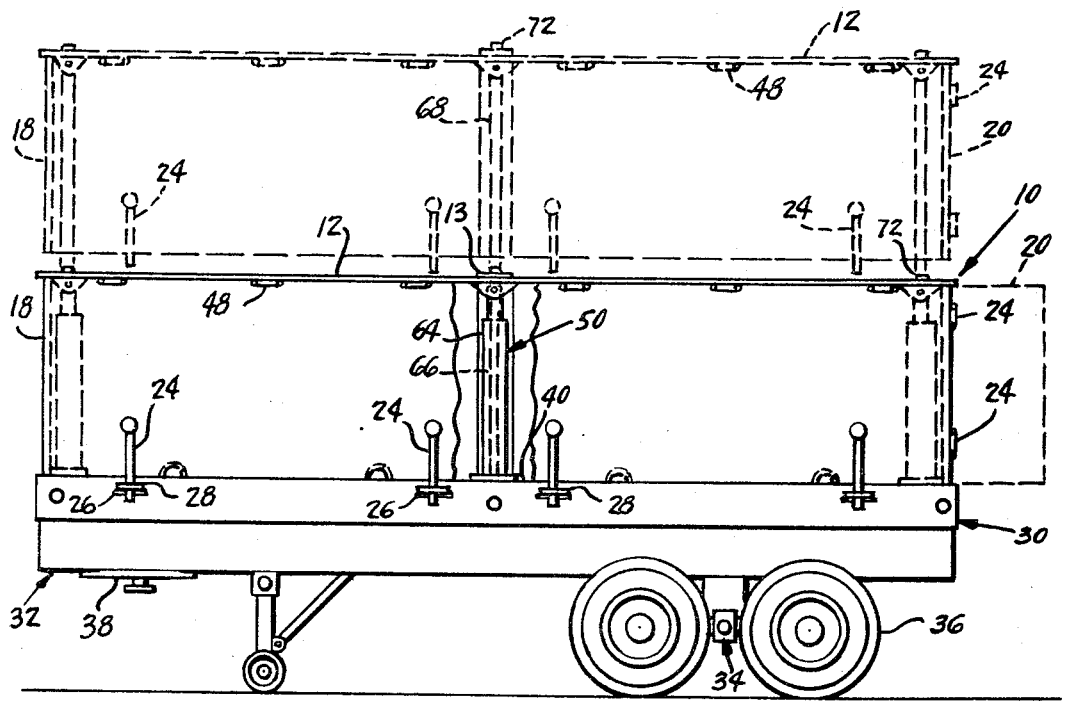
FIGURE 2 is a view in elevation of the van envelope including a central sectional view of the van as secured in place on a flat bed vehicle, shown in solid lines, and as shown in the raised position above the bed of the vehicle, as indicated in dotted lines.
Figure 3:
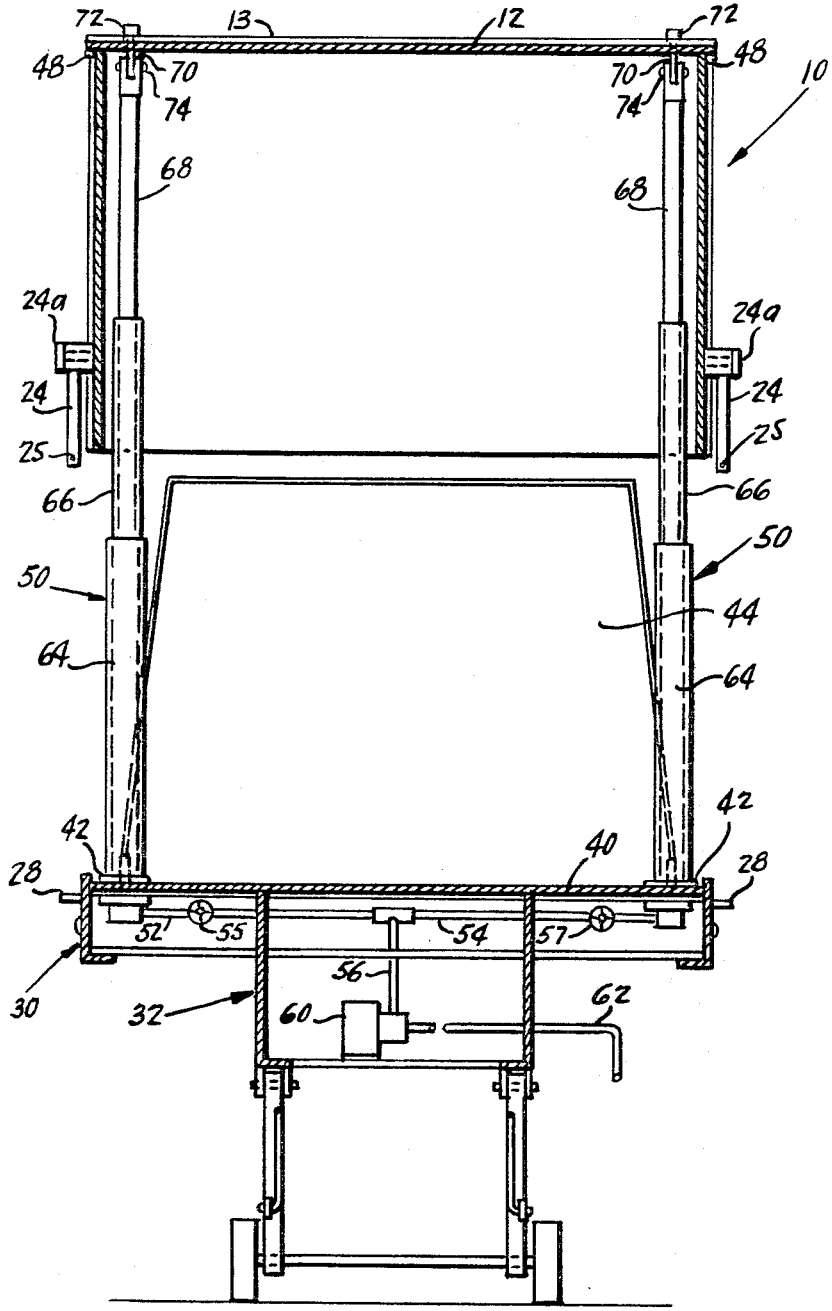
FIGURE 3 is a sectional view of FIGURE 1, taken substantially on lines 3—3.

Referring to FIGURES 1, 2, 3 and 4, van envelope 10 is comprised of a roof or top 12, sides 14 and 16, front end 18 and rear doors 20 and 22 of a van type. Doors 20 and 22 are secured by conventional hinges 24 to the rear end of sides 14 and 16, as best shown in FIGURE 1. Front end 18 is integrally or fixedly secured to the ends of sides 14 and 16. Front end 18 and sides 14 and 16 are secured by latch means 24 and 26 to keeper 28 secured to load carrying bed 30, which is of a substantially rectangular shape and fixedly supported on chassis 32 which is supported in a suitable manner on truck means 34 having a plurality of supporting ground wheels 36. The front end of chassis 32 may have a fifth-wheel connection 38 for attachment to a tractor, or may even be a part of the chassis of a truck vehicle, as desired. The intermediate portion of roof means 12 has a strengthening structural member 13, as best shown in FIGURE 1. Latch 24 has an aperture 25 for securingly receiving latch member 26 therein, as shown in FIGURE 3. Latch means 24 is pivotally secured by pivot means 24a to van envelope 10 at each side 14 and 16 and front 18.

Figure 4:
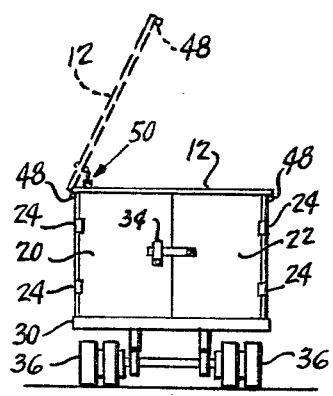

Doors 20 and 22 are rigidly closed and secured by rear latch means 34 as shown in FIGURE 4.

Bed means 30 has a turned up lip portion 40 forming a groove 42 to receive the lower edges of van envelope 10, of FIGURE 3, when in the lower position as shown in solid lines of FIGURE 2.

Referring more specifically to FIGURE 3, load carrying bed 30, at the front end, has a heavy end plate or block 44 fixedly secured as shown in FIGURE 3, to absorb forward thrusts of a shifting load occasioned by sudden stops of the vehicle or the like to prevent the front end 18 of envelope 10 from being damaged by rapid shifting of a heavy load forward.

Roof 12 is hingedly secured by conventional hinge means 48 to sides 14 and 16. Each hinge 48 has removable pintels or pins so that the roof 12 may be hinged back, for vertically receiving loads from a hoist or derrick, as shown by the roof 12 in dotted lines of FIGURE 4 with pintels removed at one side and being raised by a hydraulic jack means 50, as hereinafter described.

The base of hydraulic jack means 50 is rigidly secured to load bed 40 and connected with a conventional fluid pressure supply through conduits 52, 54 and 56 which communicates with a master control accumulator 60 connected to a conventional hydraulic or pressure system (not shown for clarity) conventionally operated by any power source, such as, the motor of a truck or trailer tractor and the like.

Conduits 52 and 54 carrying fluid or air have manually operated control valves 55 and 57 to selectively raise the roof 12 as shown in FIGURES 3 and 4. When the roof 12 is hingedly secured to sides 14 and 16, the van envelope 10 may be raised by proper manual operation of control operational lever 62 if valves 55 and 57 are open which allows operation of plural jack means 50, as shown in FIGURE 3.

Fluid jack means 50 is comprised of cylinder 64 operably secured to platform 40, and having an internal piston 66 which terminates in a movable vertical support standard 68, hingedly secured to a support gusset plate type of bearing 70 having a portion 72 sealably and rotatably protruding through roof 12.

During operation, members 26 may be removed from latch means 24, and control lever 62 turned to operative position and the fluid pressure supplied control chamber 60 will actuate the jacks 50 uniformly to raise van envelope 10, as shown, in FIGURE 3, for side or end loading by a fork truck.

If top loading is desired then members 26 are not removed from latch means 24, the pintels of hinges 48 for one side are removed allowing roof 12 to hinge. Then by selectively controls or closing of either valve 55 or 57, all of jacks 50 along one side is actuated by control lever 62 whereby the roof 12 is hingedly raised, as desired, as shown in FIGURE 4.

Of course, valves 55 and 57 are open when lever 62 is positioned for operation or raising of van enclosure 10, as shown in FIGURE 3. To lower van envelope 10, lever 62 is repositioned in its non-operative position to deenergize jack means 50, the same applies to the lowering of roof 12 in FIGURE 4.

The hydraulic system and jacks of this invention may be replaced by conventional gear and selectively powered screw jacks, if desired, within the purview of this invention.

From the foregoing it will now be seen that there is herein provided a new and improved loading van envelope for trucks, trailers and like vehicles which accomplishes all the objects of this invention during use, and others, including many advantages of great practical utility and commercial importance.

The van envelope 10 may be fabricated or structurally strengthened and secured in any manner on load bed 30, as desired, within the purview of this invention.

As many embodiments may be made of the various embodiments hereinbefore shown and described as desired by those skilled in the art without departing from this inventive concept, it being understood that all matter herein is to be interpreted merely as illustrative, and not in a limiting sense, except as set forth in the following appended claims.

I claim:
1. A load carrying vehicle which comprises
   an undercarriage,
   a substantially rectangular floor on said carriage,
   a van body comprising side walls and end walls normally resting on said floor,
   a roof,
   hinge means connecting each side of said roof to one of said side walls,
   means for selectively disconnecting one or both of said hinge means from either side wall,
   releasable latch means for latching said side walls to said floor, extensible lift means interiorly of said van body mounted on each side of said floor adjacent the ends thereof and detachably connected to said roof, and means for selectively actuating the lift means on either or both sides of said floor, whereby when said means latching said side walls to said floor is released and the hinges on both sides of said roof are connected said roof and body including said side and end walls are lifted from said floor to permit side or end loading onto said floor when said lift means on both sides are simultaneously actuated,
   and when said means latching said side walls to said floor is engaged and one of said hinge means and the adjacent lift means is disconnected, with the other of said hinge means connected, actuation of the lift means on the side of said floor opposite said released hinge means pivots said roof to open position about the adjacent connected hinge to permit top loading from the selected side.

2. The structure of claim 1, wherein said lift means comprise hydraulically operated cylinders and pistons.

3. The structure of claim 2 wherein said pistons are releasably pivotally connected to said roof.

4. The structure of claim 3 wherein the cylinders on each side of said floor are supplied with hydraulic fluid from a separate line extending from a common source of supply, and a valve in each line comprises the means for selectively actuating the lift means on either side of the floor.

5. The structure of claim 1 wherein the body includes full width rear access doors in the rear end wall.

6. The structure of claim 1 wherein said undercarriage comprises a wheel supported trailer.

7. The structure of claim 1 wherein the releasable latch means for latching said side walls to said floor is provided with actuating means exterior of the body.

References Cited by the Examiner
UNITED STATES PATENTS

| | | | |
|---|---|---|---|
| 2,656,216 | 10/1953 | Bobroff | 296—137 |
| 2,949,867 | 8/1960 | Ramsey | 296—100 X |
| 2,977,900 | 4/1961 | Farrar | 296—100 X |
| 3,053,562 | 9/1962 | Farber | 296—137 |
| 3,098,456 | 7/1963 | Eisner | 296—137 |
| 3,140,116 | 7/1964 | Speas | 296—100 |
| 3,186,756 | 6/1965 | Saut et al. | 296—100 |

FOREIGN PATENTS 839,158  6/1960  Great Britain.

BENJAMIN HERSH, Primary Examiner.

C. C. PARSONS, Assistant Examiner.